UNITED STATES PATENT OFFICE.

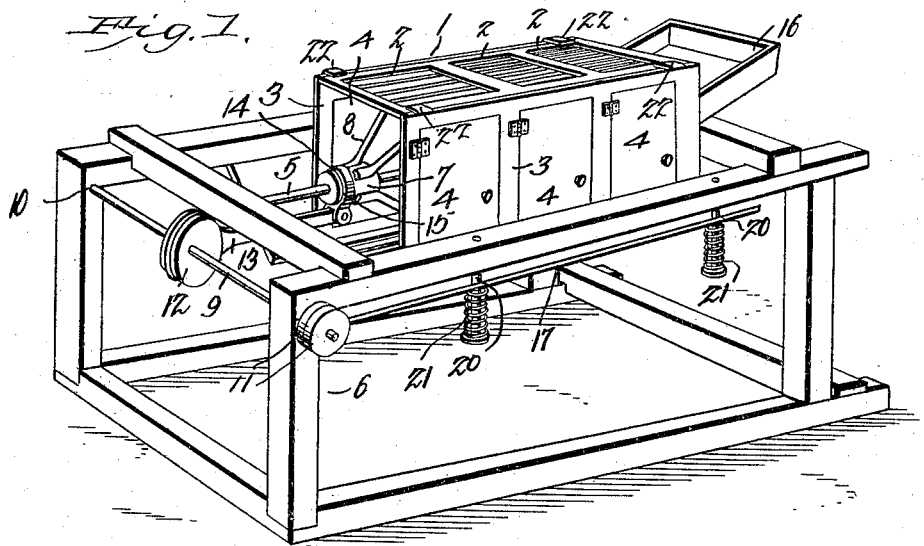

WILLIAM F. PILLMORE AND DAVID ANDEREGG, OF WESTERNVILLE, NEW YORK.

BEAN-SEPARATOR.

SPECIFICATION forming part of Letters Patent No. 709,646, dated September 23, 1902.

Application filed March 11, 1902. Serial No. 97,734. (No model.)

*To all whom it may concern:*

Be it known that we, WILLIAM F. PILLMORE and DAVID ANDEREGG, citizens of the United States, residing at Westernville, in the county of Oneida and State of New York, have invented a new and useful Bean-Separator, of which the following is a specification.

Our invention is an improved separator especially adapted for separating and sizing green beans and peas; and it consists in the peculiar construction and combination of devices hereinafter fully set forth and claimed.

In the accompanying drawings, Figure 1 is a perspective view of a bean-separator embodying our improvements. Fig. 2 is a vertical longitudinal sectional view of the same. Fig. 3 is a vertical transverse sectional view of the same.

In the embodiment of our invention we provide a box or body 1, which is preferably rectangular in cross-section and has its opposite sides formed by series of screens 2 of varying sizes, the meshes or interstices of which become larger as they approach the rear or discharge end of the box or body. Any suitable number of these screens may be employed, according to the number of grades or sizes into which it is desirable to separate or assort the beans. Between the screens on opposite sides of the box or body the same is provided with closed sides 3, which are preferably provided with doors 4 to admit access to the interior of the box or body.

A longitudinally-disposed supporting and guide bar 5 is supported in a somewhat-inclined position by a frame 6, which may be either of the form here shown or of any other suitable construction. The said supporting and guide bar extends longitudinally through the center of the screen box or body, and the latter is provided with interiorly-disposed spider-heads 7ª, through which the said supporting and guide bar 5 passes, said spider-heads mounting the said screen box or body for revoluble movement on said supporting and guide bar 5 and also adapting the said screen-box to be reciprocated longitudinally on said bar 5. On the latter at the lower or discharge end of the screen-box is a longitudinally-movable sleeve 7. The same is connected by arms 8 to the inner sides of the screen-box. We here show a shaft 9, which is journaled in bearings 10 at one end of the frame 6 and has pulleys 11, one fast and one loose, by which it may be rotated or stopped at will, and an eccentric 12. The latter is connected by a pitman 13 to a strap 14, which is disposed transversely of and around the sleeve 7 and is fitted in an annular groove 15, with which said sleeve is provided. It will be understood that upon rotating the shaft 9 reciprocating motion will be imparted to the screen-box, and it will be further understood that the latter may be turned on the bar 5 so that either side thereof may be disposed lowermost. A trough 16 is here shown to discharge into the open upper feed end of the screen-box. Within the scope of our invention any suitable means may be employed to impart reciprocating motion to the screen-box, and we do not desire to limit ourselves in this particular. Under the screen-box is a hopper 17, which is divided by a series of transversely-disposed partitions 18 into a series of compartments 19, the latter being coincident, respectively, with the variously-sized screens on the under side of the screen-box. As here shown, hanger-rods 20 depend from side bars of the frame 6 and pass through openings in the sides of the hopper, whereby the latter is vertically movable on said hanger-rods, and springs 21, which are here shown as coiled extensile springs disposed on said hanger-rods under the sides of the hopper, yieldably support the latter and maintain the hopper, with its partitions 18, closely disposed and in contact with the lower side of the screen-box. The said yieldably-supported hopper by reason of its partitions being thus disposed against the under side of the screen-box prevents the latter from turning when the same is in operation, but enables the screen-box to be turned manually when the lower screen or screen and side thereof becomes clogged with beans to reverse the position of the screen-box, and thereby cause the beans to drop from the clogged screens and to bring the oppositely-disposed screens or screened side into operation. To prevent friction between the screen-box and the partitions of the hopper which bear against the under side thereof, the intermediate sides 3 of the screen-box are provided with guideways 22 for the sides of the screens, in which the latter are adapted to reciprocate independently of the intermediate sides 3. The connections 8 are secured to the said screens, so that the latter are moved longitudinally by the means hereinbefore described, and the edges of the intermediate sides 3 bear on the upper sides of the partitions 18, thereby preventing the reciprocating screens from coming in direct contact with the said partitions.

We do not desire to limit ourselves to the precise construction and combination of devices herein shown and described, as it is evident that modifications may be made therein without departing from the spirit of our invention.

Having thus described our invention, we claim—

1. In a separator of the class described, the combination of a screen-box of polygonal form having screens longitudinally movable independently thereof, a support on which said screen-box is revoluble, means to impart reciprocating motion to the screens of said screen-box, and a yieldably-supported hopper having transverse partitions to bear against the under side of the screen-box, substantially as described.

2. In a separator of the class described, the combination of a supporting and guide bar, a screen-box of polygonal form mounted for longitudinal and revoluble movement on said bar, means to impart reciprocating motion to said screen-box, and a yieldably-supported hopper having partitions to bear against the under side of the screen-box, for the purpose set forth, substantially as described.

3. In a separator of the class described, the combination of a guiding and supporting bar, a screen-box of polygonal form mounted for revolution on said bar, and having certain of its sides formed by screens which are slidably connected thereto, so that said screens may be moved longitudinally independently of the box, means to impart reciprocating motion to the said screens, and a yieldably-supported hopper bearing against the lower side of the revoluble box, substantially as described.

In testimony that we claim the foregoing as our own we have hereto affixed our signatures in the presence of two witnesses.

WILLIAM F. PILLMORE.
DAVID ANDEREGG.

Witnesses:
WALTER T. CRILL,
EDWIN S. WARRUP.